United States Patent
Dowd et al.

(10) Patent No.: US 7,377,497 B2
(45) Date of Patent: May 27, 2008

(54) AERATION SYSTEM AND METHOD

(75) Inventors: Robert Peter Dowd, Lebanon, PA (US); Wojciech Wyczalkowski, Harrisburg, PA (US); Peter John Knights, Newbury (GB)

(73) Assignee: Philadelphia Gear Corporation, King of Prussia, PA (US)

(*) Notice: Subject to any disclaimer, the term of this patent is extended or adjusted under 35 U.S.C. 154(b) by 391 days.

(21) Appl. No.: 11/228,379

(22) Filed: Sep. 16, 2005

(65) Prior Publication Data

US 2007/0063359 A1    Mar. 22, 2007

(51) Int. Cl.
*B01F 3/04* (2006.01)
(52) U.S. Cl. .......................... 261/93; 261/123
(58) Field of Classification Search ............... 261/84, 261/91–93, 121.1, 123
See application file for complete search history.

(56) References Cited

U.S. PATENT DOCUMENTS

| | | | | |
|---|---|---|---|---|
| 3,385,576 A * | 5/1968 | Wikswo | | 261/93 |
| 3,814,396 A | 6/1974 | Di Gregorio et al. | | 261/93 |
| 4,166,704 A | 9/1979 | Albert | | 366/167 |
| 4,409,100 A | 10/1983 | Rajendren | | 210/219 |
| 4,896,971 A | 1/1990 | Weetman | | 366/330 |
| 4,900,480 A | 2/1990 | Litz | | 261/36.1 |
| 4,966,690 A | 10/1990 | Gardiner | | 210/86 |
| 4,981,674 A | 1/1991 | Peacey | | 423/498 |
| 4,992,241 A | 2/1991 | Provencher et al. | | 420/528 |
| 5,006,283 A | 4/1991 | Schutte et al. | | 261/93 |
| 5,030,362 A | 7/1991 | Da Silva | | 210/774 |
| 5,196,148 A | 3/1993 | Nigrelli | | 261/76 |
| 5,620,250 A | 4/1997 | Chilcoat et al. | | 366/168.2 |
| 5,783,118 A | 7/1998 | Kolaini | | 261/37 |
| 5,851,443 A | 12/1998 | Rajendren | | 261/87 |
| 5,925,290 A | 7/1999 | Hills | | 261/36.1 |
| 5,925,293 A * | 7/1999 | Howk | | 261/93 |
| 5,972,661 A * | 10/1999 | Kubera et al. | | 435/104 |
| 6,032,931 A | 3/2000 | Plunkett | | 261/77 |
| 6,076,812 A * | 6/2000 | Lisi | | 261/92 |
| 6,135,430 A | 10/2000 | Bergman, Jr. | | 261/93 |
| 6,142,458 A | 11/2000 | Howk | | 261/93 |
| 6,318,705 B1 * | 11/2001 | MacLaren | | 261/87 |
| 6,357,725 B2 | 3/2002 | Nomura | | 261/93 |

(Continued)

FOREIGN PATENT DOCUMENTS

DE    87 07 683    11/1987

(Continued)

OTHER PUBLICATIONS

Rogers, K.J., "Wet FGD Forced Oxidation: A Review of Influencing Factors and a Comparison of Lance and Sparge Grid Air Introduction Methods," *EPRI-DOE-EPA Combined Utility Air Pollutant Control Symposium*, Washington, D.C., 1997, 1-7.

*Primary Examiner*—Scott Bushey
(74) *Attorney, Agent, or Firm*—Woodcock Washburn LLP

(57) ABSTRACT

A system for introducing air into a slurry in a flue gas desulphurization process includes a stationary lance and an impeller. The lance include an outlet portion and a vane assembly. The outlet directs air away from the impeller. The vane assembly may produce turbulence and may convert a portion of the swirling flow from the impeller into longitudinal flow.

27 Claims, 3 Drawing Sheets

U.S. PATENT DOCUMENTS

| | | | |
|---|---|---|---|
| 6,439,756 B1 | 8/2002 | Forschner | 366/101 |
| 6,460,830 B1 | 10/2002 | Boulant | 261/93 |
| 6,811,296 B2 | 11/2004 | Weetman | 366/102 |
| 7,172,177 B2* | 2/2007 | Durda | 261/28 |
| 2002/0158377 A1 | 10/2002 | Dunne et al. | 266/217 |
| 2004/0245683 A1 | 12/2004 | Kuhlmann et al. | 266/225 |
| 2005/0167858 A1* | 8/2005 | Jones et al. | 261/28 |

FOREIGN PATENT DOCUMENTS

| | | |
|---|---|---|
| DE | 296 22 379 | 3/1997 |
| DE | 299 09 312 U1 | 9/1999 |
| GB | 2 094 279 A | 9/1982 |
| GB | 2 164 576 A | 3/1986 |
| JP | 61 120 623 | 6/1986 |
| JP | 63 104 637 | 5/1988 |

* cited by examiner

AERATION SYSTEM AND METHOD

BACKGROUND OF THE INVENTION

This invention relates to apparatus and methods for injecting gas into a fluid and, more particularly, to a lance and mixer configuration and related method for injecting air into a slurry.

In some conventional flue gas desulfurization systems, a wet scrubber brings sulfur-bearing gas into contact with a limestone/water slurry. Sulfur in the flue gas reacts with lime or limestone to produce calcium sulfite ($CaSO_3$). A slurry containing calcium sulfite is contained in large tanks. Typically, air is injected into the slurry to oxidize the calcium sulfite into calcium sulfate ($CaSO_4$). The oxidation reaction makes the slurry easier to handle and the byproduct (calcium sulfate is better known as gypsum) has value and can be recovered.

The mass transfer coefficient, which is a constant of proportionality between the rate of oxygen uptake and the oxygen deficit, is a general measure of the efficiency of an aeration device or configuration in the transfer of oxygen or other gas to water or other fluid. Specifically, the mass transfer coefficient, kla, is a constant for a particular device or configuration in the equation:

$$dc/dt = kla(C_S - C)$$

where:
  $dc/dt$ = rate of change in concentration of the gas in solution
  kla = overall mass transfer coefficient
  $C_S$ = saturation concentration of gas in solution
  $C$ = actual concentration of gas in solution A conventional system for injecting air into a slurry is disclosed in published UK Patent Application GB 2 164 576A and is illustrated in FIG. 1 (Prior Art). The conventional system includes a tank 100, a generally vertical gas lance 102, and an impeller 104. The air lance 102 and impeller 104 are submerged in a slurry 106. Flow from the impeller, which is schematically illustrated by directional arrows I in FIG. 1, promotes mass transfer between the gas and liquid.

Operation of the impeller creates swirling flow, which forms a low pressure region at the center of the swirl or vortex. Gas exiting lance 102 may flow backwards into the low pressure region toward impeller 104, which flow is schematically illustrated by directional arrow F in FIG. 1. The term "flooding" is used to refer to the condition in which air from lance 102 contacts the blades of impeller 104. During flooding, the mass transfer efficiency of the system greatly diminishes, and the life of the impeller or its drive may be shortened.

SUMMARY

A system is provided for introducing gas into a slurry disposed in a tank. The system includes an impeller and a lance that preferably is spaced apart from the impeller. The lance is stationary relative to the tank. The gas preferably is air for oxidizing a slurry of calcium sulfite in a flue gas desulfurization system. The impeller is disposed in the tank for agitating the slurry. The lance is disposed on an outflow side of the impeller. The lance includes a conduit, through which the gas passes, and at least one vane that is coupled to the conduit. The conduit has an outlet formed therein that is generally directed away from the impeller.

Two main embodiments are described for illustration. In the first embodiment, the vane is a single, approximately planar blade. In the second embodiment, the vane is a vane assembly that includes pair of vanes disposed on opposing sides of the lance. A first one of the pair of vanes is pitched relative to a second one of the pair of vanes, and the vanes are pitched in an orientation opposing the direction of swirling flow of the impeller. Preferably, an outlet portion of the lance is approximately parallel to the axis of rotation of the impeller.

A method of injecting gas into a slurry is also provided. The method includes including the steps of: (a) providing a tank containing the slurry; (b) providing an agitator that includes an impeller; (c) providing a gas lance that is disposed in the tank on an outflow side of the impeller; (d) injecting gas into the tank through the gas lance; and (e) rotating the impeller to create flow of slurry over the gas lance. The gas lance includes an outlet that is generally directed away from the impeller and at least one vane.

The inventors theorize that the lance and impeller system directs flow from the impeller and converts at least a portion of a swirling flow from the impeller into longitudinal flow, which would tend to improve mass transfer, as manifested in the mass transfer coefficient, and diminish flooding.

DETAILED DESCRIPTION OF PREFERRED EMBODIMENTS

The systems and components described herein are for injecting gas into a slurry and promoting mass transfer, and especially for injecting air into a slurry that includes calcium sulfite ($CaSO_3$) in a flue gas desulfurization process. In the presence of air, calcium sulfite oxidizes into calcium sulfate ($CaSO_4$), which then may be removed from the slurry by well-known processes.

Figure 2:
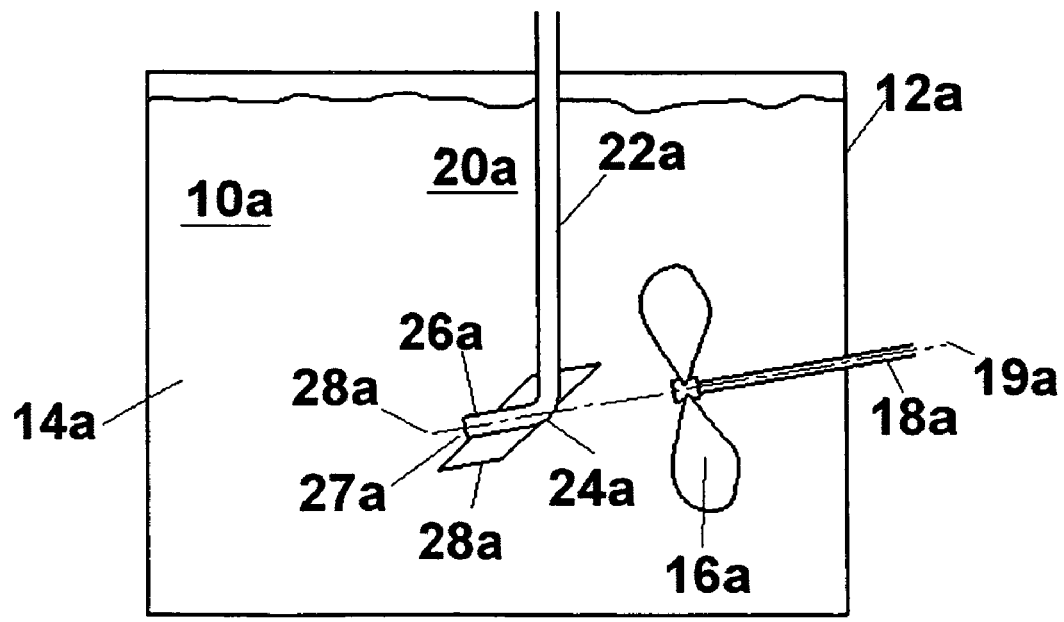
FIG. 2 is a schematic view of a lance and impeller system according to a first embodiment of the present invention.

Referring to FIG. 2 to schematically illustrate a first embodiment of a system for injecting gas into a slurry, a combination lance and impeller system 10a is shown disposed in a tank 12a holding a slurry 14a. System 10a, which the assignee refers to as AirWing™, includes an impeller 16a and a lance 20a. Impeller 16a, as well as impellers for other embodiments described herein, preferably is a prop-type. The present invention is not limited to any particular style or structure of impeller, but rather encompasses any equipment that can produce predominantly axial flow (that is, flow that is predominantly parallel to the impeller axis) over the lance. Impeller 16a is mounted onto a shaft 18a that preferably extends through a sidewall of tank 12a.

Figure 3:
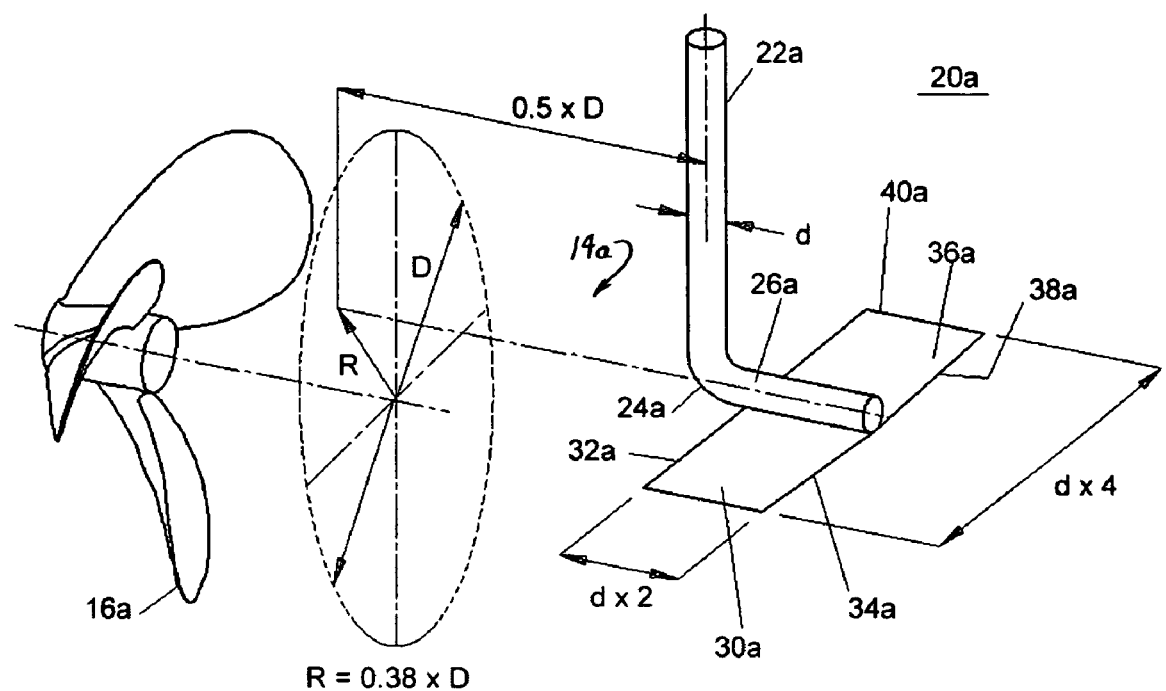
FIG. 3 is a view of the lance shown in FIG. 2.

As shown in FIG. 2 and FIG. 3, lance 20a, which is (somewhat schematically) shown in FIG. 3, includes a conduit for supplying air. The conduit includes a main supply pipe such as downcomer 22a, an elbow 24a, an outlet portion 26a, and a vane assembly 30a. Downcomer 22a and outlet portion 26a preferably are solid, straight pipes of circular cross-section. An outlet 27a is formed in a distal end of outlet portion 26a. Outlet portion 26a may be approximately parallel to a central impeller axis 19a such that outlet portion centerline 28a, outlet 27a, and the flow from the outlet are approximately parallel to a central impeller axis 19a. Preferably, outlet portion centerline 28a and impeller axis 19a are downwardly pitched at approximately 10° to approximately 15°. Also, axis 28a may be non-parallel to axis 19a. And axes 28a and 19a may be generally horizontal such that outlet portion centerline 28a, outlet 27a, and the flow from the outlet are generally horizontal.

Vane assembly 30a is a substantially flat (that is, planar), rectangular plate that includes a leading edge 32a, a trailing edge 34a, an upper surface 36a, a lower surface 38a, and a pair of opposing peripheral edges 40a. Upper surface 36a is attached to outlet portion 26a by welding, casting, or bolting, or by other conventional means. Preferably, leading edge 32a and trailing edge 34a are horizontal and perpendicular to a central axis 19a. Peripheral edges 40a preferably are mutually parallel and parallel to outlet centerline 28a. Vane assembly 20a, downcomer 22a, elbow 24a, and outlet portion 26a may be formed of any suitable alloy, such as corrosion resistant nickel chromium alloys.

FIG. 3 illustrates some preferred relationships between portions of lance 20a and impeller 16a, and more information about the preferred dimensional or geometric relationships is provided in the text. Elbow 24a preferably has an inside radius equal to or greater than pipe internal diameter d, primarily for pressure drop reasons. Pipe internal diameter d is shown schematically in FIG. 3. Vane 30a preferably has a length (parallel to outlet portion 26a) about two to about four times pipe internal diameter d, and more preferably about twice the pipe internal diameter, and a width (perpendicular to its length) about three to about five times pipe internal diameter, and more preferably about four times pipe internal diameter. Outlet centerline 28a is offset from the centerline of impeller 16a by a distance R, which preferably is about 25% to about 100% of the impeller diameter D, and more preferably about 35% to about 45% of the impeller diameter D, and more preferably about 38% of the impeller diameter D. Preferably, downcomer 22a is spaced apart from impeller 16a by about one third to about two thirds impeller diameter D, and more preferably about one-half impeller diameter D. The relative position of lance 20a relative to impeller 16a is primarily based on flooding considerations.

The above parameters are provided for illustration and general guidance. The present invention is not limited to any of these parameters, except that a particular claim may be so limited where it explicitly recites a parameter. Further, a person familiar with aeration technology upon reading this disclosure will understand that the parameters may be altered to suit a particular application, and that many of the parameters are related such that changing one requires adjusting others.

In operation, a compressor (not shown in the figures) pushes air through lance 20a and lance outlet 27a. A motor (not shown in the figures) attached to impeller shaft 18a rotates impeller 16a to move slurry in a predominantly axial flow, with swirl, over lance 20a. Impeller size in a typical commercial installation may vary (preferably) from 35 inches (900 mm) to 55 inches (1400 mm). Often, the air flow parameters of a commercial installation may be chosen according to a superficial gas velocity range generally between 0.3 and 0.57 cm/s, as referred to above. And the superficial gas velocity for a particular commercial installation may outside the above range, according to the particular process requirements. As used herein, superficial gas velocity is a theoretical value obtained by dividing the total air flow rate by the cross-sectional area taken horizontally across the tank.

Accordingly, the conduit diameter may vary depending upon the desired air flow (such as superficial gas velocity) and other process parameters—between 3 inches and 12 inches (80 mm-300 mm) may be typical. The vane size in the commercial installation may generally follow the geometry and dimensions based on the conduit diameter, as shown and described with respect to FIG. 3. The above dimensions may vary, of course, (including varying outside of the preferred superficial gas velocity range) according to the parameters of the particular application, as such parameters are understood by persons familiar with aeration in flue gas desulfurization systems in view of this disclosure.

Figure 1:
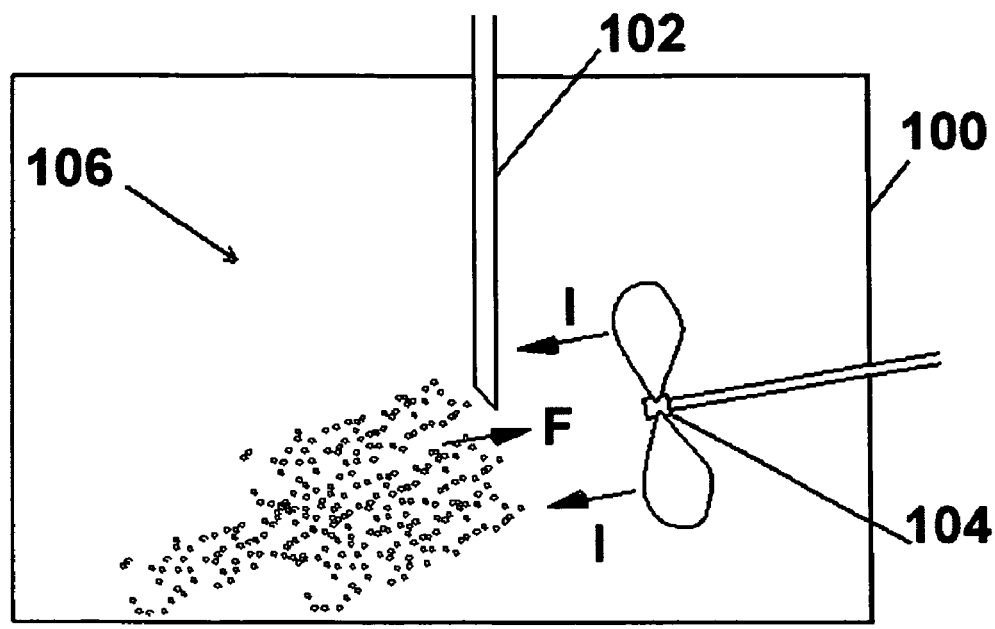
FIG. 1 (Prior Art) is a schematic view of a conventional lance and impeller system.

Lance and impeller system 10a produces improved mass transfer compared to the prior art system shown in FIG. 1. To demonstrate and measure the improved performance relative to the prior art lance configuration, mass transfer coefficient (kla) of system 10a was determined.

The test measurements were performed in a clear, cylindrical vessel having a diameter of six feet. A known amount of sodium sulfite ($Na_2SO_3$) was introduced into the vessel in the presence of small amount of $CoCl_2$, which acts as a catalyst. Impeller 16a was used to mix the vessel and compressed air was supplied to lance 20a. The time necessary to oxidize sodium sulfite was measured and the mass transfer coefficient kla was calculated by the following equation:

$$kla[1/h] = \frac{(Na_2SO_3)(16)(3600)}{126(V_{vol})(T)(c)}$$

where ($Na_2SO_3$) is the amount of $Na_2SO_3$ dumped into the tank in moles;

$V_{vol}$ is the vessel volume in liters;

T is time to oxidize all of the $Na_2SO_3$ in the tank;

c is the oxygen saturation concentration in g/liter;

and 16 and 126 are the molecular weight of the components in g/mol.

The impeller used for the testing was a prop-type impeller having a 1.5 prop pitch and a 6" (six inch) diameter. The impeller operated at from 1200 to 1800 rpm. The air flow ranged flow from 1,000 to 1,900 standard cubic feet per hour (scfh), which produced a superficial gas velocity between 0.3 and 0.57 cm/s. The total power, which includes power used by the air compressor and by impeller motor, ranged from 0.1 to 0.4 W/kg (that is, watts per kilogram of fluid). The concentration of $Na_2SO_3$ was 0.008 mol/kg in the oxidizer tank.

Figure 4:
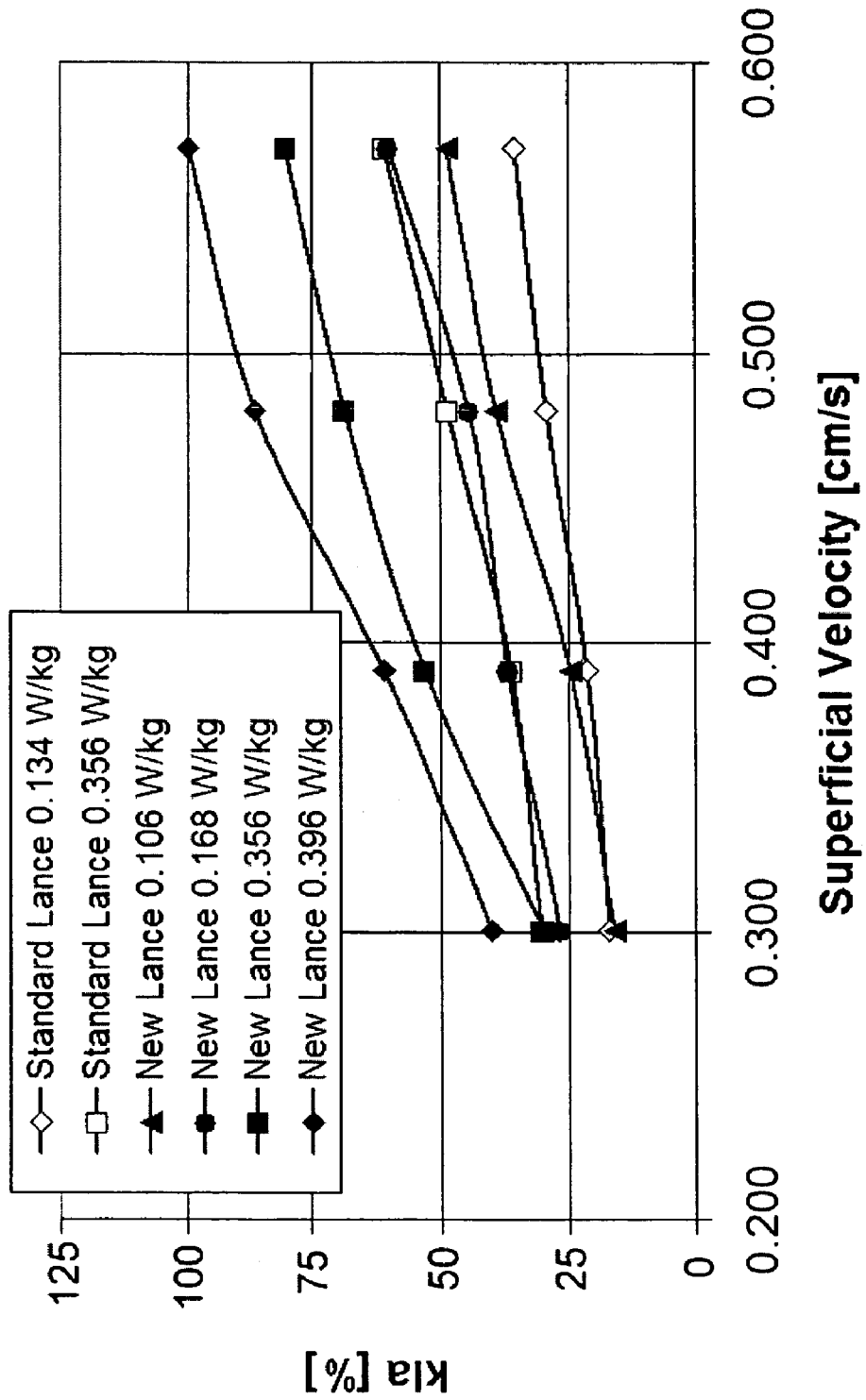
FIG. 4 is graph of performance of the embodiment shown in FIG. 2 and the prior art configuration of FIG. 1.

The results of the test of lance 20a and impeller 16a are provided in FIG. 4, which also shows test results of the conventional lance 102 shown in FIG. 1. The data for lance 20a is labeled in FIG. 4 as "NEW"; the data for conventional lance 102 is labeled as "STD". As the data was taken in a mixture of clean water, sodium sulfite, and catalyst, the mass transfer coefficient data of FIG. 4 is provided as a percentage of the maximum measured magnitude rather than units of 1/time.

The superior mass transfer of the inventive lance 20a is clear from FIG. 4, as for example by a direct comparison between the relative magnitudes of mass transfer coefficient for inventive lance 20a and prior art lance 102 (1) at the same specific power usage of 0.356 W/kg, which is reflected in the plots indicated by a solid square and hollow square, respectively, and (2) where the inventive lance 20a was operated at a significantly lower power usage but produced a greater mass transfer coefficient than that of the prior art lance 102 over most of the operating range, which improvement is reflected in the plots indicated by solid triangles and hollow diamonds, respectively.

The following explanation for the improved performance of lance and impeller system 10a is provided to ensure complete disclosure, and such explanation is not intended to limit the scope of the claims unless as expressly recited in a claim-at-issue. The inventors believe that lance assembly 20a provides two aspects that produce improved mass transfer: improved turbulence and directional flow. First, vane assembly 30a creates additional turbulence in the outlet flow from impeller 16a. The added turbulence tends to reduce the gas bubble size, which improves mass transfer between the air and slurry. Second, elbow 24a and outlet portion 26a direct the gas away from impeller 16a, which diminishes the likelihood and severity of flooding of the impeller and, also, enables lance outlet 27a to be located close to the impeller compared with conventional lances. Further, vane assembly 30a may convert a portion of the swirling flow from impeller 16a into longitudinal flow in a direction that is generally away from the impeller.

Figure 5:
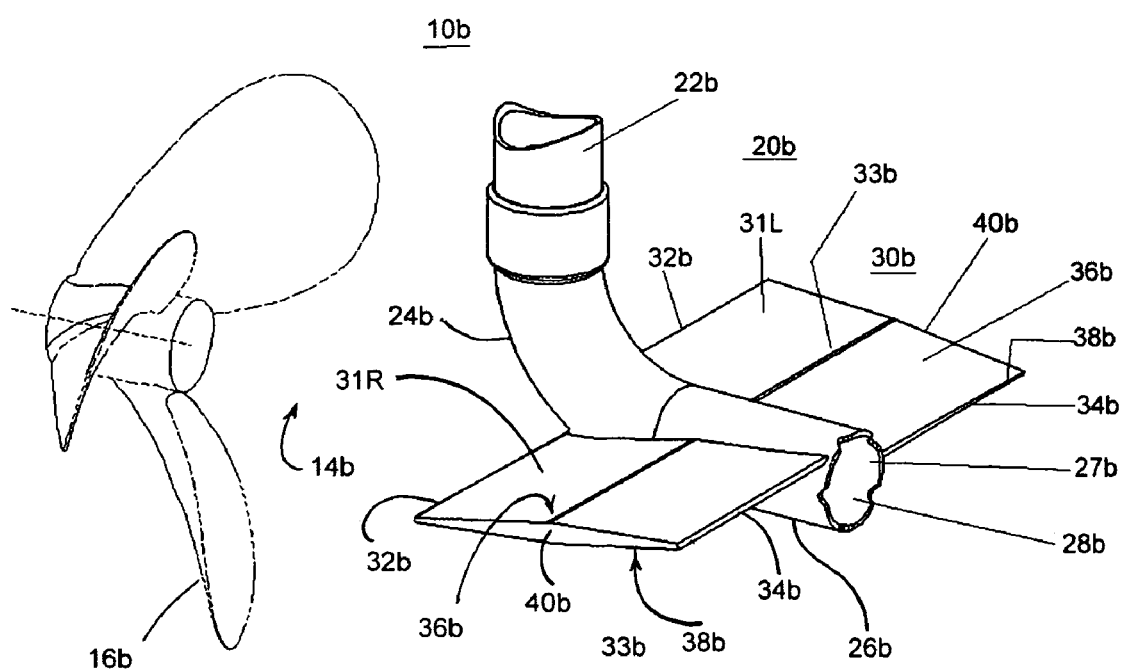
FIG. 5 is a view of another embodiment of the present invention.

Referring to FIG. 5 to illustrate another embodiment of the present invention, a lance 20b is part of a lance and impeller system 10b. Lance 20b is disposed in a slurry 14b that is contained in a tank 12b (not shown). Slurry 14b and an impeller 16b, which are shown schematically in FIG. 5, and tank 12b are as generally described herein with respect to first embodiment system 10a.

Lance 20b includes a downcomer 22b, an elbow 24b, an outlet portion 26b, and a vane assembly 30b. Downcomer 22b and outlet portion 26b preferably are solid, straight pipes of circular cross-section. An outlet 27b is formed in a distal end of outlet portion 26b. Preferably, outlet portion 26b is generally pitched downwardly at the same angle as the impeller axis, which preferably is pitched downwardly at about 10° to about 15°, such that its centerline 28b, outlet 27b, and the flow from the outlet is generally parallel to the impeller axis. Also, outlet portion 26b may be oriented generally horizontal such that its centerline 28b, outlet 27b, and the flow from the outlet is generally horizontal.

Vane assembly 30b includes a pair of vanes 31L and 31R disposed on opposing sides of outlet portion 26b. Each vane assembly 31L and 31R has a leading edge 32b, a trailing edge 34b, an upper surface 36b and a lower surface 38b. Vanes 31L and 31R vary in thickness, as each has a relatively thick portion 33b generally at its center that tapers to relatively thin portions at leading edge 32b and trailing edge 34b.

The present invention or embodiment encompasses vanes having a side profile that is flat and uniform, as illustrated in FIGS. 2 and 3, and tapered. FIG. 5 illustrates a side profile of vane 30b that is tapered in both the forward and rearward directions, and the present invention encompasses any kind of taper. Also, the present invention encompasses any configuration of vanes, including for vanes having a curved side profile.

Each one of vanes 31L and 31R is affixed to a side of outlet portion 26b and pitched relative to outlet centerline 28b. Preferably, vanes 31L and 31R are oppositely pitched and oriented opposite to the direction of swirl of the outlet flow from impeller 16b. For example, if the direction of the swirling flow from impeller 16b is clockwise, vanes 31L and 31R are oriented toward producing a local, relative counterclockwise region.

The inventors expect that vanes 31L and 31R would convert a portion of the swirling flow into longitudinal flow, which would tend to direct air flow away from impeller 16b, even though such configuration has not been tested. Vane assembly 30b may also enhance turbulence to improve mass transfer as described above.

As used herein, the phrase "converting a portion of the swirling flow to longitudinal flow" generally indicates that a portion of the swirl component or tangential component of the flow vector from the impeller is diminished relative to the longitudinal component of the flow vector. The inventors believe that lance 20a and lance 20b convert a portion of the swirling flow to longitudinal flow, but the present invention is not limited to lances that convert a portion of the swirling flow to longitudinal flow unless such function is expressly recited in the particular claim considered. And the present invention encompasses converting swirling flow to longitudinal flow by any mechanism. As shown in the figures, the preferred orientation of vane assembly 30a and 30b is approximately horizontal or perpendicular to downcomer 22a and 22b, and test results indicate that a vertical orientation or orientation parallel to downcomer 22a and 22b is disfavored if all other parameters are unchanged.

The description of the system and its components herein is provided for illustration purposes and is not intended to limit the scope of the invention. Unless a particular claim explicitly recites it, the present invention is not limited, for example, to lances having an outlet portion and outlet flow that is substantially parallel to the impeller axis or substantially horizontal, or to lances having any particular structure that is not expressly recited in the claims. The main supply pipe need not be approximately vertical, but rather may take any configuration including extending through the tank sidewall. The elbow need not be a 90 degree elbow. Rather than being limited to the particular embodiments disclosed herein, the scope of the present invention should be determined according to the explicit language of the claims.

We claim:

1. A system for introducing gas into a slurry disposed in a tank, said system comprising:
   an impeller disposed in the tank for agitating the slurry, and
   a stationary lance disposed on an outflow side of the impeller, the lance including (i) a conduit through which the gas passes, the conduit having an outlet formed therein that is generally directed away from the impeller, and (ii) at least one vane coupled to the conduit.

2. The system of claim 1 wherein the lance is spaced apart from the impeller.

3. The system of claim 1 wherein the at least one vane is a single, approximately planar blade.

4. The system of claim 1 wherein the at least one vane converts at least a portion of a swirling flow from the impeller into longitudinal flow.

5. The system of claim 1 wherein the at least one vane is a pair of vanes disposed on opposing sides of the lance, a first one of the pair of vanes is pitched relative to a second one of the pair of vanes such that the vanes have an orientation opposing the direction of swirling flow of the impeller.

6. The system of claim 5 wherein the vanes convert a portion of the swirling flow into longitudinal flow.

7. The system of claim 5 wherein the vanes are approximately planar.

8. The system of claim 5 wherein each vane is relatively thin at a leading edge and a trailing edge and is relatively thick therebetween.

9. The system of claim 1 wherein the conduit includes a main supply pipe, an elbow, and an outlet portion, and the gas outlet is disposed in the outlet portion.

10. The system of claim 9 wherein the outlet portion is approximately parallel to an impeller axis of rotation.

11. The system of claim 10 wherein the impeller axis of rotation is pitched approximately 10° to approximately 15° below horizontal.

12. The system of claim 9 wherein the direction of the gas outlet is substantially horizontal.

13. The system of claim 9 wherein the elbow has an inside radius equal to or greater the internal diameter of the main supply pipe.

14. The system of claim 9 wherein the vane has a length about two to about four times the internal diameter of the main supply pipe.

15. The system of claim 14 wherein the vane length is about twice the pipe internal diameter.

16. The system of claim 14 wherein the vane has a width about three to about five times the pipe internal diameter.

17. The system of claim 16 wherein the width is approximately four times the pipe internal diameter.

18. The system of claim 9 wherein a centerline of the outlet portion is offset from an impeller axis of rotation by a distance R that is approximately 25% to 100% of the impeller diameter.

19. The system of claim 18 wherein the distance R is approximately 35% to approximately 45% of the impeller diameter.

20. The system of claim 18 wherein the distance R is approximately 38% of the impeller diameter.

21. The system of claim 18 wherein the main supply pipe is spaced apart from the impeller by approximately one third to approximately two thirds the impeller diameter.

22. The system of claim 18 wherein the main supply pipe is spaced apart from the impeller by approximately one-half the impeller diameter D.

23. The system of claim 9 wherein the at least one vane is connected to the horizontal portion of the conduit.

24. The system of claim 23 wherein the main supply pipe is a downcomer that is approximately vertical.

25. The system of claim 1 wherein the conduit includes an approximately horizontal portion, said portion terminating to form the gas outlet.

26. The system of claim 1 wherein the gas lance outlet is offset from a longitudinal center line of the agitator.

27. The system of claim 1 wherein the slurry comprises calcium sulfite in a flue gas desulfurization process.

* * * * *